(12) United States Patent
Beeksma et al.

(10) Patent No.: US 7,125,330 B2
(45) Date of Patent: Oct. 24, 2006

(54) OVERHEAD CONVEYOR FOR POULTRY

(75) Inventors: Albert Beeksma, Aa Oostzaan (NL); Cees De Heer, Jr., Aa Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 218 days.

(21) Appl. No.: 10/870,714

(22) Filed: Jun. 17, 2004

(65) Prior Publication Data

US 2005/0037705 A1 Feb. 17, 2005

(30) Foreign Application Priority Data

Jun. 18, 2003 (NL) .................................. 1023690

(51) Int. Cl.
*A22B 7/00* (2006.01)

(52) U.S. Cl. ..................................................... 452/178

(58) Field of Classification Search ................. 198/373, 198/375, 377.01, 377.03, 411; 452/177–180
See application file for complete search history.

(56) References Cited

U.S. PATENT DOCUMENTS

| | | | |
|---|---|---|---|
| 3,739,902 A * | 6/1973 | Ingram et al. .............. | 198/374 |
| 3,860,104 A * | 1/1975 | Strauss .................... | 198/459.3 |
| 4,490,091 A * | 12/1984 | Brems ......................... | 198/375 |
| 5,092,815 A | 3/1992 | Polkinghorne | |
| 5,261,520 A * | 11/1993 | Duke .......................... | 198/375 |
| 5,875,738 A * | 3/1999 | Hazenbroek et al. ....... | 119/716 |
| 6,010,398 A | 1/2000 | Mente | |
| 6,179,701 B1 * | 1/2001 | Tieleman .................... | 452/179 |
| 6,435,332 B1 * | 8/2002 | Price .......................... | 198/375 |
| 6,478,668 B1 * | 11/2002 | Visser et al. ................ | 452/179 |
| 6,811,480 B1 * | 11/2004 | Moriarty .................... | 452/188 |
| 6,830,508 B1 * | 12/2004 | Hazenbroek et al. ....... | 452/188 |

FOREIGN PATENT DOCUMENTS

EP 0086700 8/1983

OTHER PUBLICATIONS

EPO Search Report, Jun. 18, 2003.

* cited by examiner

*Primary Examiner*—Thomas Price
(74) *Attorney, Agent, or Firm*—Dority & Manning

(57) ABSTRACT

The invention relates to an overhead conveyor for poultry, for example chickens, having a conveyor line, and along the conveyor line movable hooks suspended therefrom with holders for the ends of the poultry's legs. The hooks are rotatable about a substantially vertical axis for the selective adjustment of a direction of movement of the poultry. Each hook is provided at the top with an adjusting plate with cams. Guide members are arranged along the conveyor line and are designed to intermate with the cams, wherein the adjusting plate is provided with at least a first type of cam having a predetermined first length and one or several cams of a second type having a predetermined second length. The first length is smaller than the second length, and the guide members are arranged such that the first type of cam is able to pass a guide member without intermating and the second type of cam is able to pass the guide member only by intermating. The hook can pivot in relation to the adjusting plate about a substantially horizontal axis. Between the adjusting plate and the holders for the ends of the poultry's legs, a catch member is provided for moving said hook out of a vertically suspended position.

8 Claims, 4 Drawing Sheets

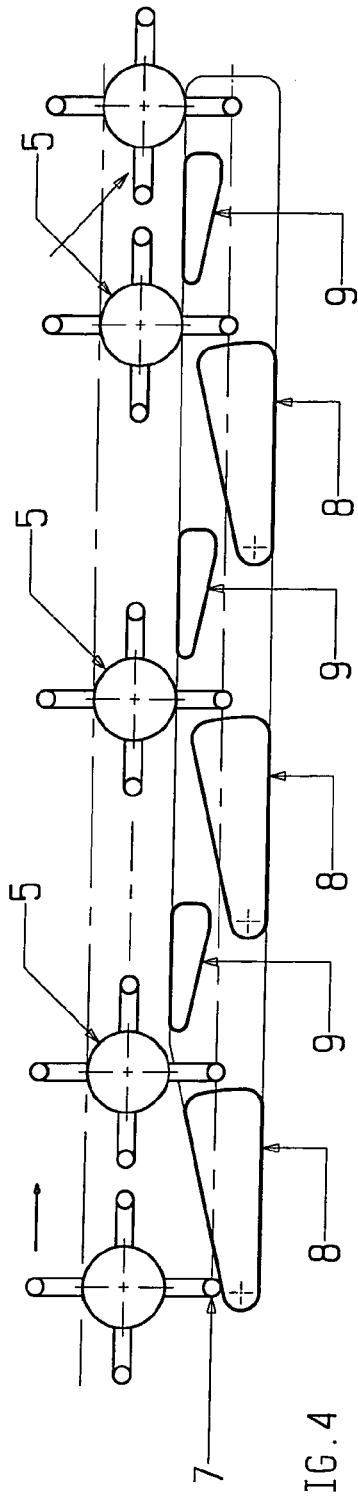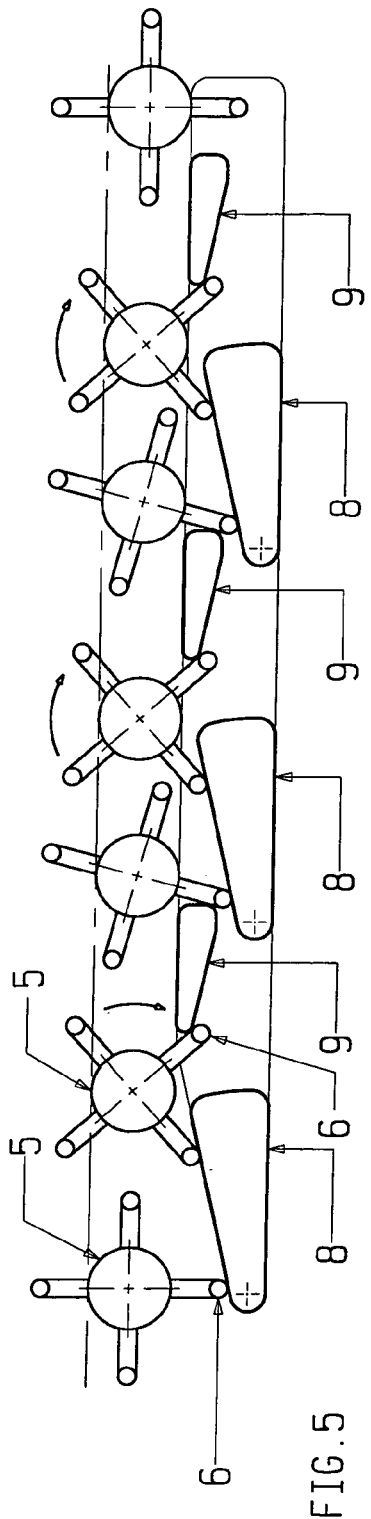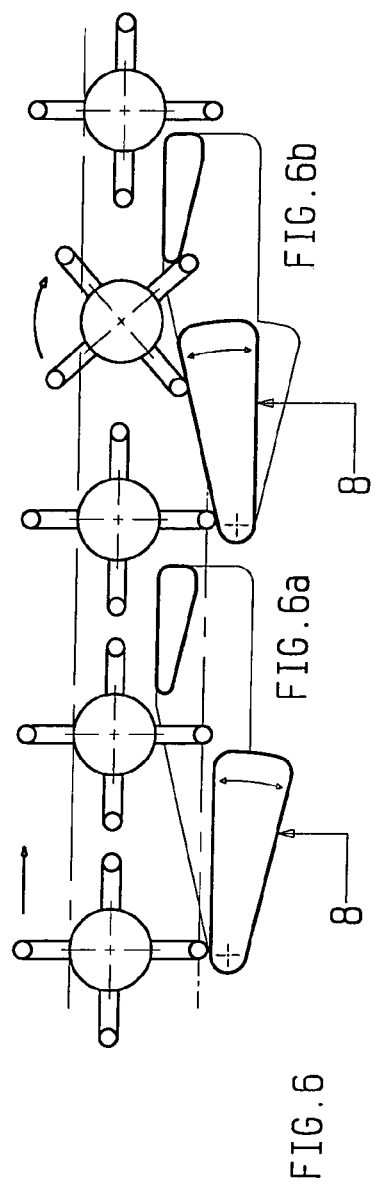
FIG. 4   FIG. 5   FIG. 6   FIG. 6a   FIG. 6b

OVERHEAD CONVEYOR FOR POULTRY

FIELD OF THE INVENTION

The invention relates to an overhead conveyor for poultry, for example chickens, having a conveyor line Along the conveyor line, movable hooks are suspended and provided with holders for the ends of the poultry's legs The hooks are rotatable about a substantially vertical axis for the selective adjustment of a direction of movement of the poultry, to which end each hook is provided at the top with an adjusting plate with cams, and to which end guide members are arranged along the conveyor line, designed to intermate with the cams. By adjusting the direction of movement of the poultry it will move in the direction of the conveyor line with the breast facing forward, sideways or backwards.

BACKGROUND OF THE INVENTION

An overhead conveyor is known from EP-A-0 444 782 and also from EP-B-0 882 405. The overhead conveyor known from EP-A-0 44 782, possesses curve plates arranged along the conveyor line, while the adjusting plate is provided with cams that are shaped such as to permit only some predetermined position settings of the hook in relation to the conveyor line. This guarantees that the processing direction of the poultry is as desired.

The overhead conveyor known from EP-B-0 882 405 is provided with a rectangular adjusting plate provided with cams. These cams are able to intermate with sinusoidal guide members so as to realize a smooth adjust of the hook. The guide members, which are embodied in pairs and affect several cams of the adjusting plate simultaneously, acquire an accurate construction. The direction of movement of the poultry is guaranteed by the fact that the rectangular adjusting plate is guaranteed by the fact that the rectangular adjusting plate is guided between fixed guides outside the area of the operating guide members. The construction allows the hook to rotate clockwise and anti-clockwise.

SUMMARY OF THE INVENTION

It is an object of the invention to construct the known overhead conveyor more simply so that the tolerance requirements are less strict, however without making any concessions regarding the possibility of guaranteeing the desired direction of movement of the poultry (backwards, sideways or forward).

A further object is to embody the overhead conveyor such as to facilitate the control over whether or not a treatment of the poultry is carried out.

This and other objectives and advantages of the invention that will become clear from the following description, or may be learned through practice of the invention, and, are achieved with the overhead conveyor according to the invention, which is characterized by one or several of the appended claims.

In a first aspect of the invention, the overhead conveyor is characterized in that the adjusting plate is provided with at least a first type of cam having a predetermined first length and one or several cams of a second type having a predetermined second length, wherein the first length is smaller than the second length The guide members are arranged such that the first type of cam is able to pass a guide member without intermating and the second type of cam is able to pass the guide member only by intermating The hook can pivot in relation to the adjusting plate about a substantially horizontal axis Between the adjusting plate and the holders for the ends of the poultry's legs, a catch member is provided for moving The hook out of a vertically suspended position.

This configuration provides a simple manner for adjusting the position of the hook and thereby the direction of movement of the poultry (backwards, sideways or forward), using the cams on the adjusting plate, making it visible through the position of the cams, while placing little restriction on the dimensions chosen for the guide member. It also allows much liberty regarding the speed or acceleration with which the cams of the adjusting plate are operated. This makes it possible to effectively adapt and optimize on the one hand the allowable rotation rates of the poultry at a particular hook adjustment, and on the other hand the maximum rate of movement allowable for the conveyor line. Concurrently, the overhead conveyor according to the invention has the advantage that at such high conveyor line speeds, the catch element provided on the hook may serve a quick removal of poultry out of the path of a processing station for the poultry located in the conveyor line. This combination of measures is neither known nor suggested in any of the cited references. The invention offers the surprising result that much higher conveyor line speeds can be reached. In the prior art, this maximum speed is approximately 6000 chickens per hour, while the apparatus according to the invention makes it possible to achieve a maximum conveyor speed of at least 8000 chickens per hour.

The overhead conveyor is preferably embodied such that the guide members are arranged in pairs and the members of each pair are shifted in relation to each other, so as to allow each pair of guide members to rotate the hooks over a circle segment of approximately 90°. This makes it possible, viewed in the longitudinal direction of the conveyor line, to adjust the adjusting plate and thereby the hook relatively gradually, which further facilitates the possibility of operating at high conveyor speeds.

The overhead conveyor is suitably embodied such that each pair of guide members possesses a first guide member and, viewed in the direction of conveyance, a second guide member placed behind the first guide member.

In a further aspect of the invention, the overhead conveyor is characterized in that the second guide member is able to functionally intermate with a cam of the adjusting plate only after the first guide member has been in operation. In this way, the movement of the adjusting plate can be realized by an apt choice of only the first guide member while the choice of the second guide member is not critical since its action is dependent on the first guide member.

To augment the adjustability, it is further desirable for at least the first guide member to be adjustable between a first, operational position and a second, inoperational position.

In yet another aspect of the invention, the overhead conveyor is characterized in that the hook possesses a hinge, which in relation to the adjusting plate is rotation-invariant, around which hinge a supporting surface is provided abutting to a spring-loaded bush, which together with the hook is rotatable and comprises grooves designed to engage a first, in relation to the conveyor line, fixed pin for the determination of preferential positions of the hook in relation to the conveyor line. This is a simple manner to ensure that the positions assumed by the hook during conveyance are reproducible so that a clean movement of the poultry in the backward, sideways or forward direction is possible.

In yet a further aspect of the invention, the overhead conveyor is characterized in that the spring-loaded rotatable bush and together with the hook is movable substantially in the vertical direction, and in that the bush comprises a non-rotatable shaft, wherein the bush and the shaft are provided with a second pin and a groove or grooves The supporting surface of the hinge of the hook has an eccentric course such that when the hook moves, the spring-loaded bush is caused to move in the vertical direction between a first position in which the second pin and the groove or grooves run free of one another, and a second position in which the second pin engages the groove or grooves.

With this provision, it is possible to realize locking to prevent rotation of the hook; i.e. when the second position is reached in which the second pin engages the groove or grooves.

The embodiment of the over head conveyor according to the invention just referred to is especially advantageous when the second position coincides with a position of the hook in which the same is outside the suspended, substantially vertical position, and that in the first position the hook is suspended substantially vertically.

An important advantage of the overhead conveyor according to the invention is that it affords the above-mentioned locking facility without the use of external guides such as known from EP-B-0 882 405.

Hereinbelow the invention will be further elucidated by way of a non-limiting exemplary embodiment and with reference to the drawing.

BRIEF DESCRIPTION OF THE DRAWINGS

The drawings show in:

FIG. 4, FIG. 5 and FIG. 6, a schematic top view to illustrate the movement of the hooks of the overhead conveyor according to the invention.

Identical reference numerals used in the figures refer to similar components, barring the exception mentioned below.

DETAILED DESCRIPTION

Figure 1:
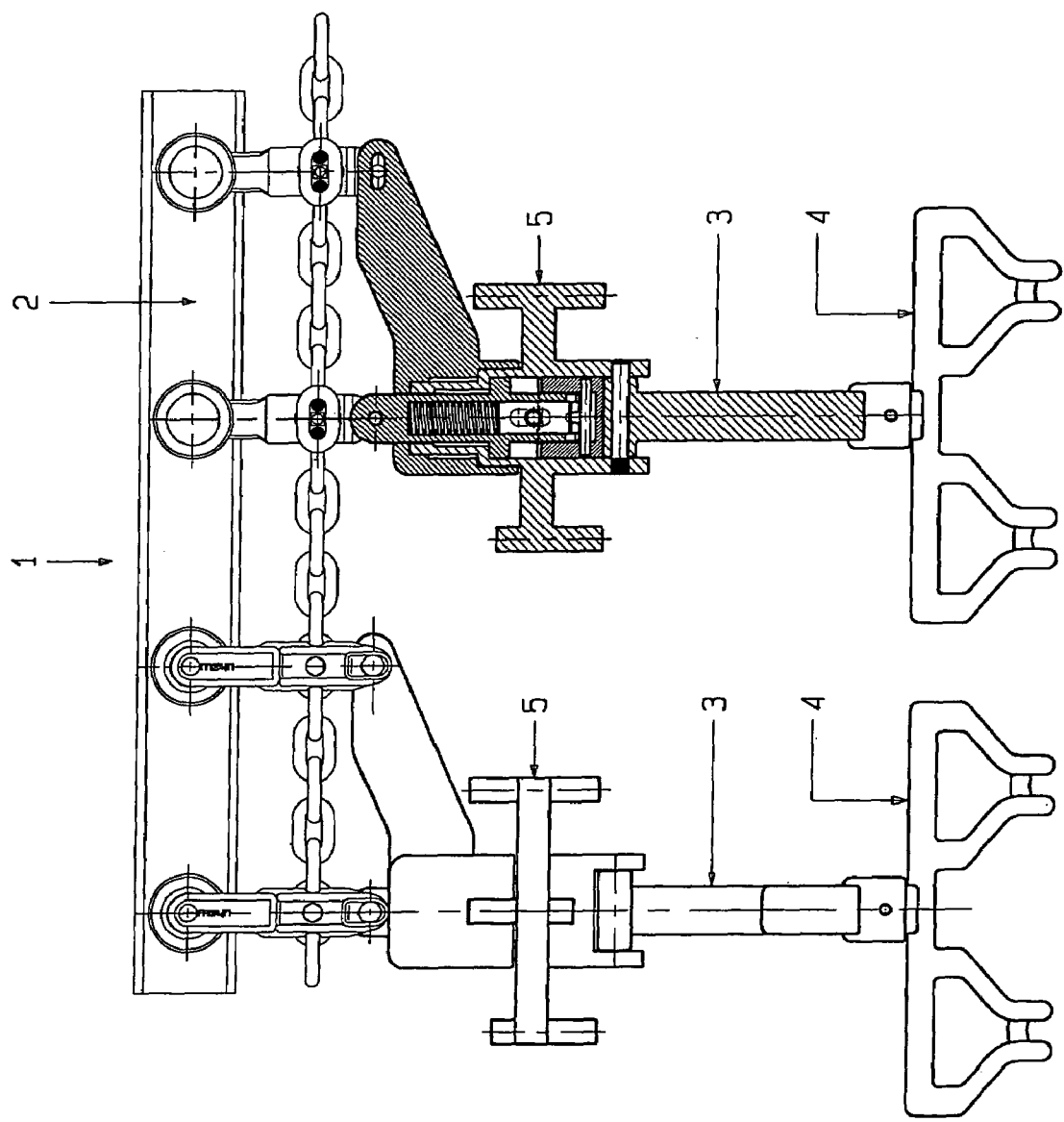
FIG. 1, part of an overhead conveyor according to the invention.

Reference will now be made in detail to embodiments of the invention, one or more examples of which are illustrated in the drawings. The embodiments are provided by way of explanation of the invention, and not meant as a limitation of the invention. It is intended that the invention include modifications and variations to the embodiments described herein.

FIG. 1 shows an overhead conveyor 1 for poultry such as chickens. Obviously, such an overhead conveyor 1 can also be used for other kinds of poultry such as turkeys or ducks.

The overhead conveyor 1 comprises a conveyor line 2, and along the conveyor line 2, hooks 3 movable along the conveyor line 2 and suspended therefrom.

The hooks 3 have the usual holders 4 for receiving the ends of the poultry's legs. In the FIGS. 2, 3, 7 and 8 to be discussed hereafter, reference numeral 4 indicates the point where the just-mentioned holders are connected to the hook 3. The hooks 3 are rotatable about a vertical axis for the selective adjustment of the direction of movement of the poultry, i.e. a backward, sideways or forward movement of the poultry, one thing and another depending on which side of the poultry is at the front. In connection with the movability of the hook 3, the same possesses an adjusting plate 5.

Figure 2:
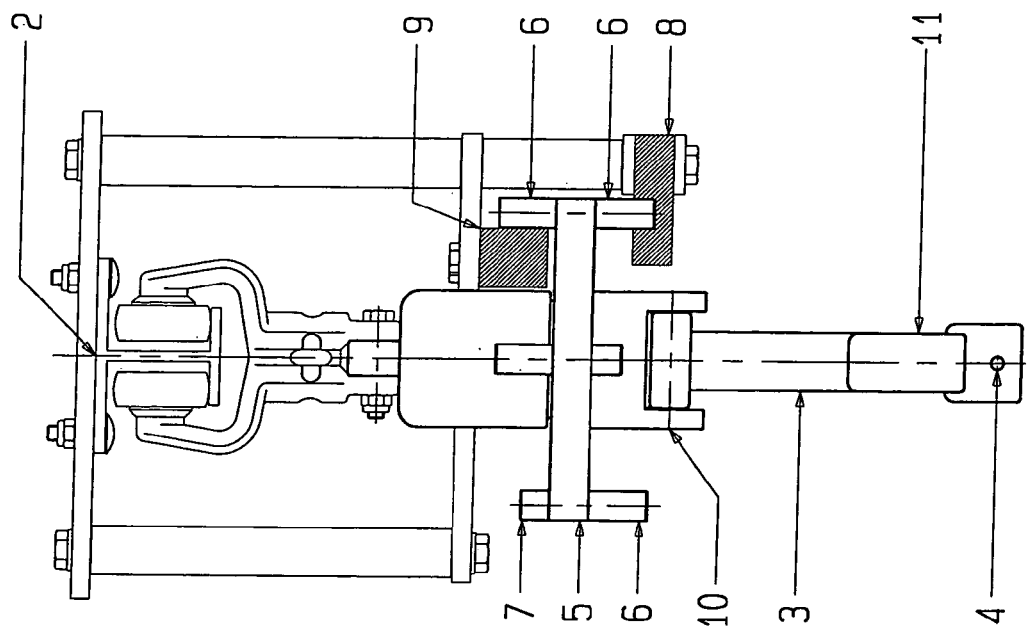
FIGS. 2 and 3, a cross-sectional view of a hook of an overhead conveyor according to the invention in different positions.
Figure 3:
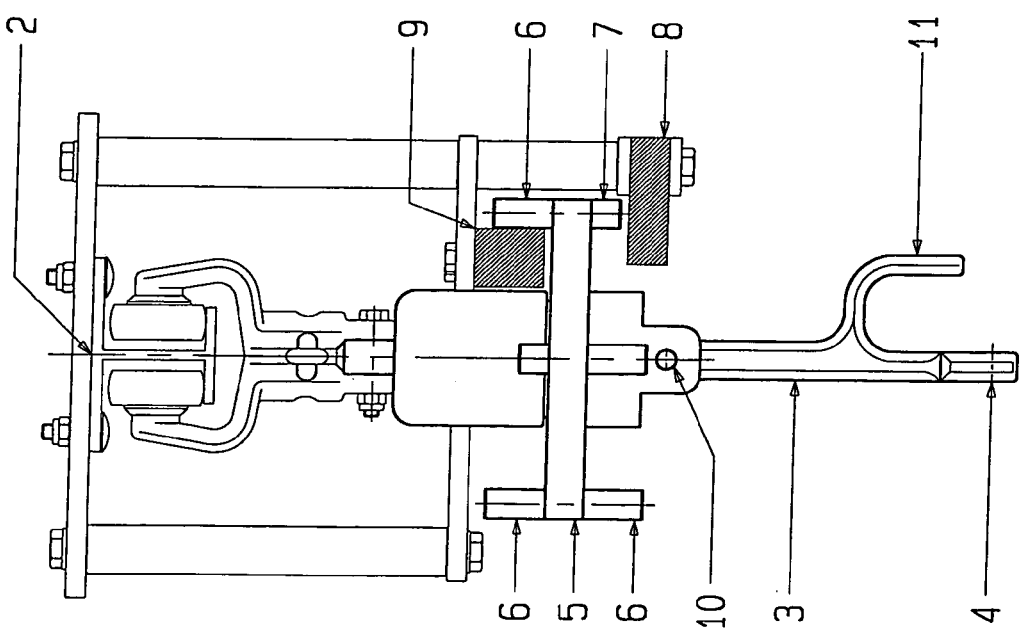

As shown more clearly in the FIGS. 2 and 3, cams 6, 7 of different lengths are provided on the adjusting plate 5. In addition, in the direction of and along the conveyor line 1, two types of guide members 8, 9 are provided that are designed to be able to intermate in any case with the longer cams 6.

As already mentioned and clearly shown in the FIGS. 2 and 3, the adjusting plate 5 is provided with at least one first type of cam 7 having a predetermined first length, and one or several cams 6 of a second type having a predetermined second length, the first length being shorter than the second length.

As will be further elucidated later on, the guide members 8, 9 are arranged in pairs, comprised of a first guide member 8 and, viewed in the direction of conveyance, a second guide member 9 positioned behind the first guide member 8. The guide members 8, 9 may be positioned both below and above as well as to the left and right of the path followed by the adjusting plate 5 Depending on the desired direction of rotation and the positioning of the cams 6, 7.

The first guide members 8 are positioned such that the first type of cam 7 is able to pass the first guide member 8 without intermating, while the second type of cam 6 is only able to pass by intermating with the first guide member 8 so that a rotational movement of the hook 3 takes place. FIG. 2 clearly shows that the hook 3 possesses a hinge 10 with a horizontally oriented axis allowing it to pivot in relation to the adjusting plate 5, and that between the adjusting plate 5 and the connecting point 4 for the holders for the ends of the poultry's legs, a catch element 11 is provided by means of which the hook 3 can be moved out of the illustrated vertically suspended position. For this purpose, a guide may be provided along the conveyor line 2, with which the poultry suspended from the hook 3 may be moved out the path of a processing station for the poultry arranged in the conveyor line 2. This guide 20 is shown in the FIGS. 7 and 8 to be discussed below.

The FIGS. 4, 5 and 6 show a few special aspects of the guide members 8, 9 of the overhead conveyor 1 according to the invention. These figures illustrate that the guide member 8 and 9 are arranged in pairs and the members of each pair are shifted in relation to each other, so as to allow each pair of guide members 8, 9 to rotate the hooks over a circle segment of approximately 90°.

FIG. 4 shows that the adjusting plate 5 with the first type of cam 7, which is shorter than the second type of cam 6, is oriented toward the first guide member 8. As in this position, the first type of cam 7 is able to pass the first guide member 8 without hindrance and without intermating, the adjusting plate 5 is not moved and the hook 3 maintains its rotational position, which determines the direction of movement of the poultry. FIG. 4 further clearly shows that in this situation, the second guide member 9 is not able to intermate with a cam of the adjusting 5; this is only possible after a cam of the adjusting plate 5 has intermated with a first guide member 8 as shown in FIG. 5.

FIG. 5 shows that a cam 6 of the second type having a greater second length is only able to pass the first guide member 8 by intermating with it. As a result, the adjusting plate 5 is moved and the second guide member 9 is able to intermate with a following cam 6 on the adjusting plate 5, in order to complete the movement of the adjusting plate 5 over a circle section of approximately 90°. The hook 3 coupled to the adjusting plate 5 obviously moves over the same circle section.

FIG. 6 shows a variant of the overhead conveyor 1 according to the invention, wherein the first guide member 8 is movable between a first, operative position (see FIG. 6*b*) and a second, inoperative position (see FIG. 6*a*).

A further aspect of the invention will be elucidated below with reference to the FIGS. 7 and 8.

As already explained, the hook 3 is rotatable in relation to the adjusting plate 5 about a horizontally oriented hinge pin 10. This hinge 10 is disposed rotation-invariantly in relation to the adjusting plate 5. The hinge 10 further possesses a support surface 12 abutting to a spring 13—loaded rotatable bush 14, provided with upwardly directed grooves 15, designed to engage a first non-rotatable pin 16 for the determination of preferential positions of the hook 3 in relation to the conveyor line 2. Movement of the adjusting plate 5 and the ensuing rotation of the hook 3 will also bring about rotation of the bush 14, which is spring 13—loaded via the first pin 16. This causes the first pin 16 to be forced against the pressure of the spring 13 out of the grooves 15, until the bush 14 has moved over a circle section of approximately 90° into a position where further upwardly oriented grooves are ready to receive the first pin 16. Thus a subsequent preferential position of the bush 14 and consequently of the hook 3 is established.

Figure 7:
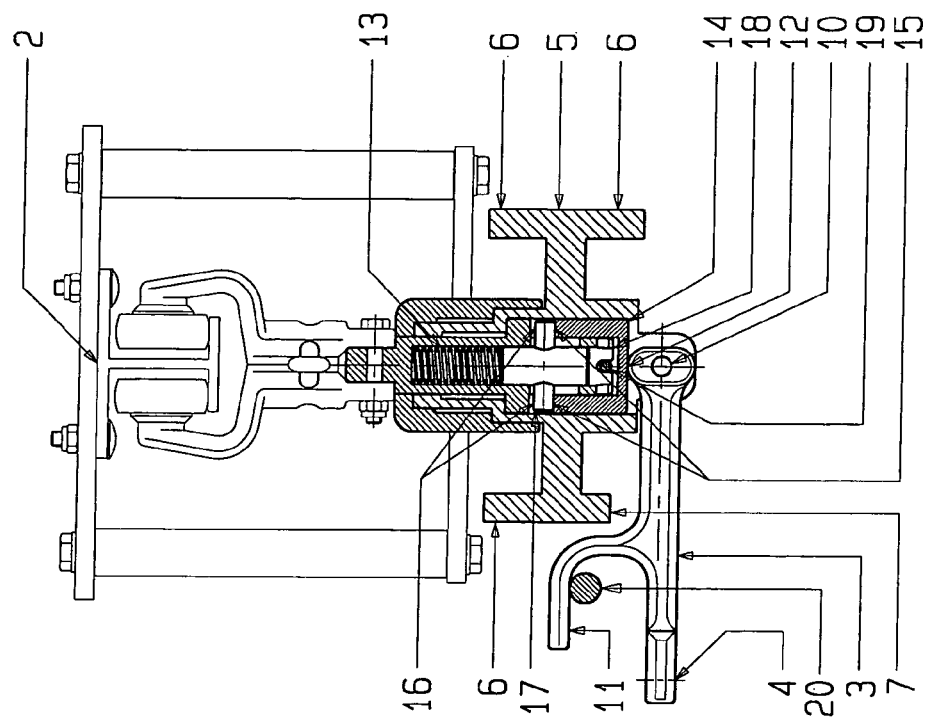
FIG. 7 and FIG. 8, schematic cross sections of the hook of the overhead conveyor according to the invention.
Figure 8:
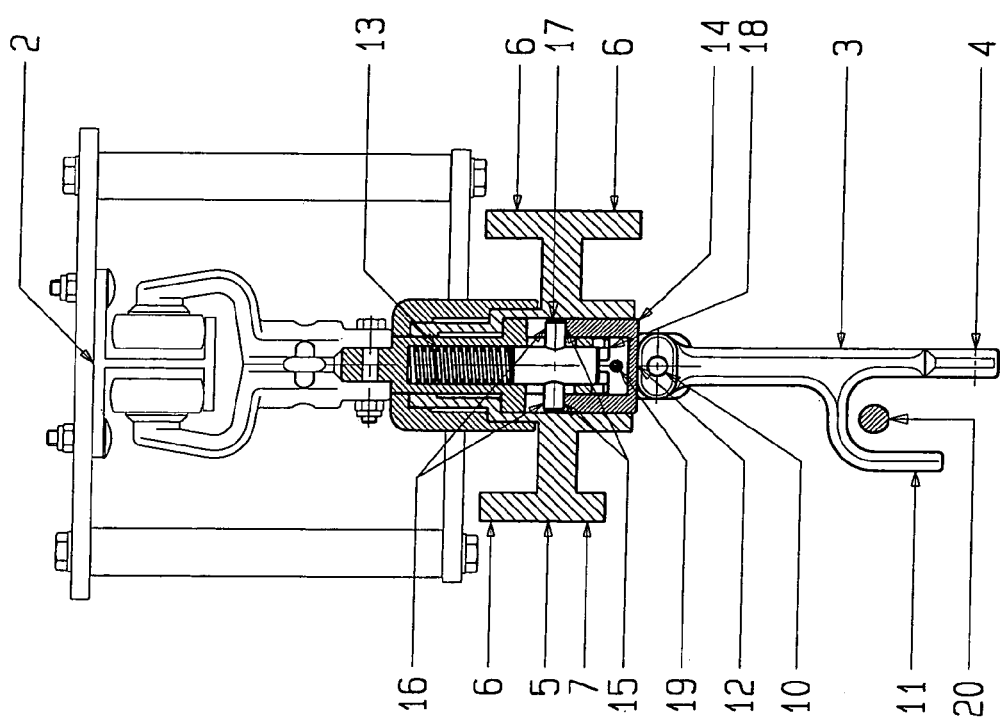

Yet another aspect of this construction can also be elucidated with reference to the FIGS. 7 and 8. In these FIGS. 7 and 8, it is shown that the spring 13—loaded bush 14, which together with the hook 3 is rotatable, incorporates a spring 13—loaded and concentric shaft 17, to which the above mentioned first pine 16 is coupled. The shaft 17 is further provided with a groove or grooves 18 that engage a second pin 19 located in the bush 14. It is, of course, also possible to place these components in reverse order. By these measures the hook 3 can be locked, which works as follows.

As the FIGS. 7 and 8 clearly show, the support surface 12 of the hinge 10 is eccentric. When the hook 3 is moved, this causes the spring-loaded bush 14 to undergo a vertical movement between a second position shown in FIG. 8, in which the second pin 19 engages the groove or grooves 18, and a first position shown in FIG. 7, in which the second pin 19 and the groove or grooves 18 run free of each other. FIG. 8 shows that in the second position the hook 3 is moved outside the suspended, substantially vertical position, while FIG. 7 shows that in the first position the hook 3 is suspended substantially vertically.

Owing to the construction elucidated by way of the FIGS. 7 and 8, the hook 3 has a number of preferential positions related to the poultry's direction of movement (backwards, sideways or forward), while each of these positions, subject to whether or not the hook assumes a position that is absolutely vertical, can be locked.

It should be appreciated by those skilled in the art that modifications and variations can be made to the embodiments described herein without departing from the scope and spirit of the appended claims or their equivalents.

The invention claimed is:

1. An overhead conveyor apparatus for processing poultry, comprising:
   a conveyor line having movable hooks suspended therefrom with holders for the poultry's legs, said hooks rotatable about a substantially vertical axis for adjustment of the suspended poultry;
   an adjusting plate configured with each said hook, said adjusting plate further comprising first cam members having a first engaging length, and a second cam members having a second engaging length that is greater than said first engaging length;
   guide members disposed along said conveyor line to engage with said second type of cam causing rotation of said adjusting plate and respective hook, said guide members having a configuration and disposed such that said first cam members pass said guide members without engaging therewith;
   said hooks pivotal relative to said respective adjusting plates about a substantially horizontal axis; and
   a catch member configured on each said hook between said holders and said adjusting plate, said catch member engageable by a guide disposed relative to said conveyor line causing said hook to pivot about said horizontal axis out of its vertically suspended position.

2. The apparatus as in claim 1, wherein said guide members are disposed in pairs of first and second guide members, each said pair of guide members spaced along said conveyor line such that each said pair of guide members rotates said hooks about 90 degrees.

3. The apparatus as in claim 2, wherein said first guide members are disposed before said second guide members in a conveying direction of said conveying line.

4. The apparatus as in claim 3, wherein said second guide members have a configuration and are disposed so as to only engage with said second cam members that have been engaged and moved by said first guide members.

5. The apparatus as in claim 4, wherein said first guide members are adjustable between an operational position wherein said first guide members engage said second cam members, and an in operational position wherein said second cam members pass by without engaging said first guide members.

6. The apparatus as in claim 1, wherein said hook pivots relative to said adjusting plate by way of a hinge that is rotationally fixed relative to said adjusting plate, and further comprising a supporting surface disposed around said hinge and disposed against a spring loaded bushing, said bushing rotatable with said hook and further comprising a first groove configured to engage a first fixed pin and define a first position of said hook relative to said conveying line.

7. The apparatus as in claim 6, wherein said bushing is movable in a substantially vertical direction and comprises a non-rotatable shaft and a second pin that engages in a second groove upon vertical upward movement of said bushing, said supporting surface comprising an eccentric course such that when said hook pivots, said spring loaded bushing is caused to move from a first position wherein said second pin is moved out of said second groove to a second position wherein said second pin is moved into said second groove.

8. The apparatus as in claim 7, wherein in said first position of said bushing, said hook is in a suspended substantially vertical position, and in said second position of said bushing, said hook is pivoted laterally out of its suspended vertical position.

* * * * *